(12) United States Patent
Mauritz

(10) Patent No.: US 12,722,688 B2
(45) Date of Patent: Sep. 1, 2026

(54) STEERING AXLE FOR A STEERABLE VEHICLE, AND INDUSTRIAL TRUCK

(71) Applicant: ZF Friedrichshafen AG, Friedrichshafen (DE)

(72) Inventor: Wolfgang Mauritz, Fürstenzell (DE)

(73) Assignee: ZF Friedrichshafen AG, Friedrichshafen (DE)

(*) Notice: Subject to any disclaimer, the term of this patent is extended or adjusted under 35 U.S.C. 154(b) by 427 days.

(21) Appl. No.: 18/055,995

(22) Filed: Nov. 16, 2022

(65) Prior Publication Data

US 2023/0159083 A1 May 25, 2023

(30) Foreign Application Priority Data

Nov. 22, 2021 (DE) .................... 10 2021 213 068.2

(51) Int. Cl.
*B62D 5/04* (2006.01)
*B62D 1/20* (2006.01)
*B62D 3/02* (2006.01)

(52) U.S. Cl.
CPC ................ *B62D 5/04* (2013.01); *B62D 1/20* (2013.01); *B62D 3/02* (2013.01); *B62D 5/0412* (2013.01);
(Continued)

(58) Field of Classification Search
CPC .... B60K 17/30; B60K 17/303; B60K 7/0007; B62D 5/04; B62D 5/0418; B62D 5/0421;
(Continued)

(56) References Cited

U.S. PATENT DOCUMENTS 2,913,063 A * 11/1959 Brown .................... B60K 1/00 180/65.6
4,461,367 A * 7/1984 Eichinger ........... B60K 17/145 180/252

(Continued)

FOREIGN PATENT DOCUMENTS

CN 204236559 U 4/2015
DE 1630616 A 7/1971

(Continued)

OTHER PUBLICATIONS

German Patent Office, Office Action issued in German patent application No. 10 2021 213 068.2 (Sep. 26, 2022).

(Continued)

*Primary Examiner* — Laura Freedman
(74) *Attorney, Agent, or Firm* — Secant IP, PLLC

(57) ABSTRACT

A steering axle for a steerable vehicle has an axle housing and a steering drive with an electric motor and motor shaft. A first planetary stage includes a first sun gear, first planet gears, and a first planet carrier. A last planetary stage includes a last sun gear, last planet gears, a last planet carrier, and a ring gear. A force flux from the motor shaft runs via the first sun gear and the first planet gears to the first planet carrier. The force flux furthermore runs via the last sun gear to the last planet gears. The force flux furthermore runs from the last planet gears to the ring gear. In relation to the axle housing, the ring gear is pivotably mounted about a pivot axis. The last planet carrier is connected in a rotationally fixed manner to the axle housing. Also disclosed is a corresponding industrial truck.

8 Claims, 1 Drawing Sheet

(52) U.S. Cl.
CPC ......... *B62D 5/0418* (2013.01); *B62D 5/0421* (2013.01); *B62D 5/0427* (2013.01)

(58) Field of Classification Search
CPC .......... B62D 5/0427; B62D 1/20; B62D 3/02; B62D 7/06; B60B 35/003
See application file for complete search history.

(56) References Cited

U.S. PATENT DOCUMENTS 4,930,590 A * 6/1990 Love .................... B60K 17/046 180/65.6
5,087,229 A * 2/1992 Hewko ................ B60K 7/0007 475/149
5,327,986 A 7/1994 Saita
5,722,501 A * 3/1998 Finch ..................... B60K 17/30 180/65.6
5,779,588 A 7/1998 Mann et al.
5,828,972 A 10/1998 Asanuma et al.
6,026,925 A 2/2000 Nagao et al.
6,039,143 A * 3/2000 Kielar .................. B62D 5/0421 180/444
6,125,963 A 10/2000 Staiger
6,279,676 B1 * 8/2001 Peppler .................... B60G 3/01 180/428
6,349,781 B1 * 2/2002 Kruse ................. B66F 9/07572 180/65.6
6,367,571 B1 * 4/2002 Schwarz ............. B60K 7/0015 180/252
6,505,700 B2 1/2003 Furumi et al.
6,523,632 B1 * 2/2003 Hanaoka .............. B62D 7/1509 180/242
6,572,502 B1 6/2003 Young et al.
6,691,819 B2 2/2004 Menjak et al.
6,854,555 B2 * 2/2005 Raue ....................... B60L 50/52 180/343
7,497,286 B2 * 3/2009 Keller ...................... B60K 6/48 180/65.6
7,549,502 B2 * 6/2009 Gaetani ................ B62D 5/0418 180/11
7,588,113 B2 * 9/2009 Scharfenberg ...... B66F 9/07572 475/156
7,591,340 B2 * 9/2009 Scharfenberg ....... B60K 7/0007 180/411
7,617,890 B2 * 11/2009 Romig ................... B62D 7/023 56/6
7,621,360 B2 * 11/2009 Stubner ................ B60K 7/0007 180/65.6
7,669,684 B2 * 3/2010 Rogg ....................... B62D 7/04 180/265
7,686,125 B2 3/2010 Andersson
7,789,784 B2 9/2010 Hayashi et al.
7,803,085 B2 * 9/2010 Himmelmann ...... B60K 17/043 180/371
7,861,820 B1 * 1/2011 Goodwin ............ B66F 9/07572 180/408
8,025,116 B2 * 9/2011 Rogg ................... B60K 7/0007 180/65.6
8,312,959 B1 * 11/2012 Schneider ................. F16H 7/16 180/443
8,439,152 B2 * 5/2013 Visscher .............. B60K 17/342 180/444
8,449,424 B2 * 5/2013 Schoon ................ B60K 17/145 475/153
8,950,520 B2 * 2/2015 Hauser ................... B62D 5/046 180/6.24
9,533,707 B1 1/2017 Longtin
9,669,865 B2 6/2017 Schröder et al.
10,293,847 B2 * 5/2019 Calmettes ............ B62D 5/0418
10,479,399 B2 11/2019 Beyerlein et al.
10,526,004 B2 1/2020 Witte
10,556,617 B2 2/2020 Wang et al.
10,647,346 B2 5/2020 Cai et al.
10,730,546 B2 8/2020 Ognibene
11,312,412 B2 4/2022 Kim
11,325,638 B2 * 5/2022 Wang ..................... B62D 17/00
11,358,636 B2 * 6/2022 Visscher .............. B62D 11/183
11,427,272 B2 8/2022 Li et al.
11,511,793 B2 * 11/2022 Anetzberger ........... F16C 29/02
11,554,807 B2 1/2023 Kondo et al.
11,608,106 B2 3/2023 Nakamura et al.
11,679,801 B2 6/2023 Kondo et al.
11,685,427 B2 6/2023 Major et al.
11,712,964 B1 * 8/2023 Drach .................. B60K 7/0015 180/245
11,939,008 B2 3/2024 Ko et al.
12,097,911 B2 * 9/2024 Ooba ..................... B62D 17/00
12,122,463 B2 10/2024 Ishihara et al.
12,291,094 B2 * 5/2025 Labelle ................ B60K 17/165
12,448,030 B2 * 10/2025 Mauritz ............... B62D 5/0418
2006/0055139 A1 3/2006 Furumi et al.
2006/0278466 A1 12/2006 Cheng
2009/0272594 A1 11/2009 Bussinger
2022/0212714 A1 7/2022 Span et al.
2023/0052313 A1 2/2023 Cai et al.
2023/0159083 A1 5/2023 Mauritz
2023/0159085 A1 * 5/2023 Stammberger ....... B62D 5/0412 180/400
2023/0159087 A1 * 5/2023 Mauritz ................... B62D 7/02 180/444
2023/0159088 A1 * 5/2023 Mauritz ............... B62D 5/0418 180/444
2023/0159097 A1 * 5/2023 Mauritz ................... B62D 7/20 180/413
2023/0174141 A1 * 6/2023 Mauritz ............. B66F 9/07568 180/411
2023/0373245 A1 * 11/2023 Pfeffer .................... F16H 57/02
2024/0132145 A1 4/2024 Jeon
2024/0270063 A1 * 8/2024 Yoon .................... B60K 7/0007

FOREIGN PATENT DOCUMENTS

DE 19911458 A1 * 10/1999 ........... B62D 5/0418
DE 10130100 A1 * 1/2003 ........... B60K 17/303
DE 103 16 599 A1 11/2004
DE 10 2004 038 411 A1 8/2005
DE 10 2004 006 722 A1 9/2005
DE 10 2006 002 485 A1 9/2007
DE 10 2009 002 934 A1 11/2010
DE 10 2009 002 935 A1 11/2010
DE 10328651 B4 * 12/2012 ............. B60K 17/30
DE 10 2014 100 865 A1 7/2015
DE 10 2016 201 227 A1 8/2017
DE 10 2017 222 334 A1 6/2019
DE 10 2017 222 887 A1 6/2019
DE 10 2019 116 644 A1 12/2019
DE 10 2018 222 232 A1 6/2020
DE 102019001515 9/2020
DE 102022205373 A1 12/2023
EP 0507137 A1 * 10/1992
EP 1747930 A1 1/2007
EP 2 569 205 B1 4/2014
EP 3 250 441 B1 1/2019
GB 2165505 A1 4/1986
JP H08258728 10/1996
JP 1999-011330 A2 1/1999
KR 20240126598 A * 8/2024
WO WO2005077695 A1 8/2005
WO WO2018152940 A1 8/2018

OTHER PUBLICATIONS

German Patent Office, Office Action issued in German patent application No. 10 2021 213 063.1 (Oct. 5, 2022).
German Patent Office, Office Action issued in German patent application No. 10 2021 213 862.4 (Jul. 8, 2022).
United States Patent Office, Non-Final Office Action issued in U.S. Appl. No. 18/056,000 (mailed Feb. 14, 2025).
United States Patent Office, Non-Final Office Action issued in U.S. Appl. No. 18/055,987 (mailed May 30, 2025).

(56) References Cited

OTHER PUBLICATIONS

United States Patent Office, Non-Final Office Action issued in U.S. Appl. No. 18/061,679 (mailed May 30, 2025).
United States Patent Office, Notice of Allowance issued in U.S. Appl. No. 18/056,010 (mailed Jul. 9, 2025).

* cited by examiner

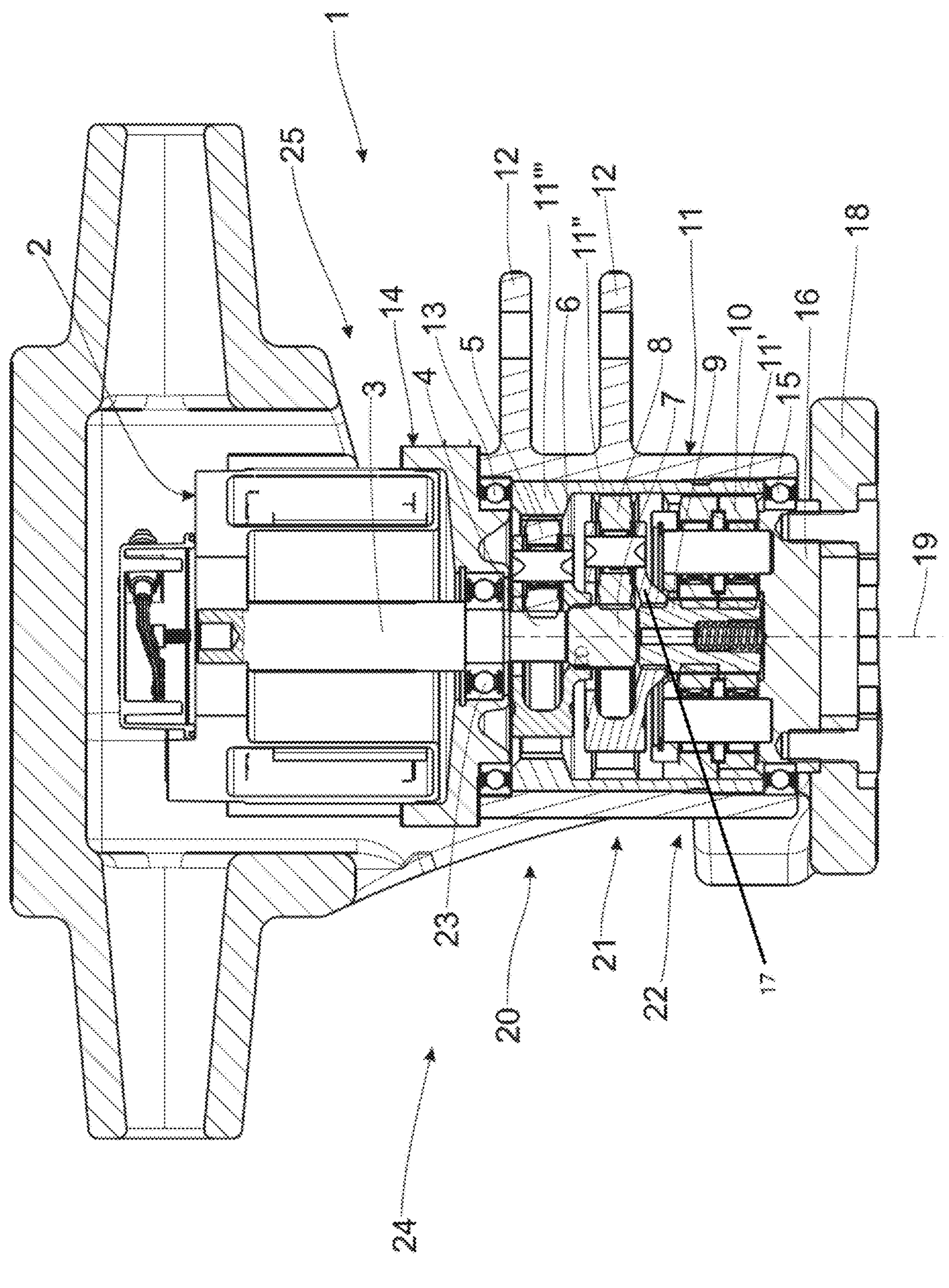
1
2
3
4
5
6
7
8
9
10
11
11'
11"
11'"
12
12
13
14
15
16
17
18
19
20
21
22
23
24
25

STEERING AXLE FOR A STEERABLE VEHICLE, AND INDUSTRIAL TRUCK

RELATED APPLICATIONS

This application claims the benefit of and right of priority under 35 U.S.C. § 119 to German Patent Application no. 10 2021 213 068.2, filed on 22 Nov. 2021, the contents of which are incorporated herein by reference in its entirety.

FIELD OF THE DISCLOSURE

The invention relates to a steering axle for a steerable vehicle and to a corresponding industrial truck.

BACKGROUND

Various embodiments of power-assisted steering units, which either support a manual steering command of a driver or, as a response to an electric signal, adjust in a self-acting manner a desired steering angle, are known in the prior art. A hydraulic cylinder or an electric motor typically serve as an actuator therein. These steering units, besides the actuator, typically comprise a steering gear in a concentric construction mode and have a shaft as the drive output. The steering units are constructed in the manner of columns, having a pedestal in the lower region, said pedestal serving for fastening to a chassis of the vehicle. The upper region of the steering unit is able to be rotated in relation to the lower region so as to adjust a steering angle at the steerable wheels.

In this context, a power-assisted steering unit for vehicles, which comprises a steering column having a pedestal as well as an electrically assisted steering apparatus having a housing and an electric motor, is known from DE 10 2019 116 644 A1, the housing in relation to the pedestal being movable in terms of one degree of freedom. The steering column in turn furthermore comprises a lower axle which is rotatably connected to the pedestal and in part is contained in the latter. The electric motor is configured such that said electric motor by way of an output shaft can set the lower axle in rotation.

SUMMARY

The known power-assisted steering units however are disadvantageous in that said power-assisted steering units, by virtue of the construction mode in the manner of a column, require a large amount of space and are subject to unfavorable mechanical loads, the latter in turn potentially leading to increased wear and a failure of the power-assisted steering units.

It is an object of the present invention to propose an improved drive for a steering axle of an industrial truck.

This object is achieved according to the invention by the steering axle for a steerable vehicle, as disclosed herein. Advantageous design embodiments and refinements of the invention are derived from the present disclosure.

The invention relates to a steering axle for a steerable vehicle, comprising an axle housing and a steering drive having an electric motor and a motor shaft, having a first planetary stage comprising a first sun gear, first planet gears and a first planet carrier, having a last planetary stage comprising a last sun gear, last planet gears and a last planet carrier, and having a ring gear, the steering drive being configured such that a force flux from the motor shaft runs by way of the first sun gear and the first planet gears to the first planet carrier, and that the force flux furthermore runs by way of the last sun gear to the last planet gears. The steering axle according to the invention is distinguished in that the force flux furthermore runs from the last planet gears to the ring gear, the ring gear in relation to the axle housing being mounted so as to be rotatable about a pivot axis, and the last planet carrier being connected in a rotationally fixed manner to the axle housing.

A steering axle, that is to say an axle having two steerable wheels, which is suitable for use in a vehicle is thus provided. The vehicle is preferably a commercial vehicle such as an agricultural machine, a work machine, or an industrial truck.

The steering axle comprises an axle housing on which all further components of the steering axle are disposed. The axle housing thus represents a kind of basic frame of the steering axle.

The steering axle furthermore comprises a steering drive, the steering drive in turn comprising an electric motor having a motor shaft. This is preferably a three-phase brushless electric motor.

The steering drive moreover comprises a first and a last planetary stage having a first or last sun gear, first or last planet gears, a first or last planet carrier, respectively, and a ring gear.

The electric motor and the planetary stages are disposed in such a manner that force flux from the electric motor runs by way of the motor shaft to the first sun gear. The motor shaft and the first sun gear here are preferably connected in a rotationally fixed manner to one another, for example by way of a spline connection or by way of a welded connection. The motor shaft and the first sun gear are particularly preferably integrally configured.

The force flux from the first sun gear runs further to the first planet gears, at least two first planet gears being provided. The first planet gears mesh with the first sun gear. The first planet gears are rotatably held by the first planet carrier such that the force flux runs further to the first planet carrier.

In turn, the first planet carrier is, at least indirectly, connected to the last sun gear, and the force flux accordingly runs from the first planet carrier to the last sun gear, optionally by way of a number of intermediate elements.

The first planet carrier and the last sun gear are preferably connected in a rotationally fixed manner to one another, in particular even integrally configured.

Alternatively, it is preferably provided that the steering drive furthermore comprises at least one intermediary planetary stage which in turn comprises an intermediary sun gear, intermediary planet gears, and an intermediary planet carrier, the force flux from the first planet carrier running by way of the intermediary sun gear and the intermediary planet gears to the intermediary planet carrier, the force flux furthermore running from the intermediary planet carrier to the last sun gear. The force flux in the at least one intermediary planetary stage thus runs in a manner analogous to that of the force flux in the first planetary stage.

The at least one intermediary planetary stage here is operatively disposed between the first planetary stage and the last planetary stage, meaning that the force flux from the first planet carrier is guided into a first intermediary planetary stage and optionally a second, third, etc., planetary stage.

To the extent that at least one intermediary planetary stage is provided, the first planet carrier is preferably connected in a rotationally fixed manner to the intermediary sun gear, and the force flux accordingly runs from the first planet carrier to the intermediary sun gear.

The first planet carrier and the intermediary sun gear are preferably also integrally configured.

In the case of a plurality of intermediary planetary stages being provided, it is advantageous for the planet carrier of the preceding intermediary planetary stage to be in each case connected in a rotationally fixed manner to the sun gear of the subsequent intermediary planetary stage, in particular to be integrally configured therewith.

The force flux from the last planet carrier of the single or last intermediary planetary stage, respectively, runs further into the last sun gear of the last planetary stage. In this case too, the connection between the intermediary planet carrier and the last sun gear is configured in a rotationally fixed manner and in particular so as to be integral.

According to the invention it is now provided that the force flux furthermore runs from the last planet gears to the ring gear. The ring gear in relation to the axle housing is mounted so as to be rotatable about a pivot axis, the pivot axis being coaxial with the first, with the last, and optionally with all, intermediary planetary stages. The last planet carrier is finally connected in a rotationally fixed manner to the axle housing.

A rotation of the motor shaft thus results in a rotating movement of the ring gear, whereas the last planet carrier is fixedly established on the axle housing.

This results in the advantage that the steering drive has a construction mode which is very short in comparison to that of the prior art, and the steering axle is accordingly configured in a comparatively space-saving manner.

The steering axle moreover preferably also comprises two steerable wheels.

According to one preferred embodiment of the invention it is provided that the ring gear is rotatably mounted on a housing of the steering drive. For example, the ring gear can radially encompass the housing and be rotatably mounted on the housing. Likewise, the ring gear per se can also be part of the housing of the steering drive and mounted so as to be rotatable in relation to the remaining part of the housing of the steering drive.

According to one further preferred embodiment of the invention it is provided that the ring gear is composed of a multiplicity of individual ring gears which are concentrically disposed. In particular, the ring gear is composed of two individual ring gears, of which a first individual ring gear meshes with the last planet gears. A second individual ring gear can mesh with the last planet gears, for example. This results in the advantage of the steering drive being easier to assemble on the steering housing.

According to one further preferred embodiment of the invention it is provided that the ring gear on an external side has at least one steering arm. In this way, a rotating movement of the ring gear can be readily converted into a steering movement of the steerable wheels of the steering axle. For example, the steering arm can activate a steering linkage of the steering axle.

According to one further preferred embodiment of the invention it is provided that the ring gear has a hub carrier for a steerable wheel of the steering axle. In this case, the axle of the ring gear is at the same time the steering axis of rotation of the axle-pivot steering system. One of the steerable wheels is thus disposed directly on the ring gear. Wheel forces are transmitted directly into the axle housing by way of the mountings of the ring gear.

According to one further preferred embodiment of the invention it is provided that the electric motor is disposed so as to be coaxial with the pivot axis. In this case, the motor shaft can advantageously be configured so as to be integral to the first sun gear. Moreover, this results in the steering drive being comparatively easy to assemble.

According to one alternatively preferred embodiment of the invention it is provided that the electric motor is disposed so as to be parallel to the pivot axis. As a result, the construction height of the steering drive is reduced, this offering advantages in terms of the usability and potential applications of the steering axle according to the invention. An advantage is derived here in particular in comparatively compact vehicles such as, for example, industrial trucks.

According to one particularly preferred embodiment of the invention it is provided that the motor shaft and the first sun gear are operatively connected by way of a belt drive, a chain drive or a spur wheel mechanism. Besides offering a reliable transmission of the force flux, this at the same time also enables the rotating speed to be reduced prior to the force flux reaching the first planetary stage. Apart from the shortened construction mode, in certain circumstances this results in the further advantage that an intermediary planetary stage can be dispensed with.

The invention furthermore relates to an industrial truck comprising a steering axle according to the invention. As a result, the advantages which have already been mentioned in the context of the steering axle according to the invention are also derived for the industrial truck according to the invention.

The invention will be explained in an exemplary manner hereunder by means of embodiments illustrated in the FIGURES.

BRIEF DESCRIPTION OF THE DRAWING

In the FIGURES:

FIG. 1 shows in an exemplary and schematic manner a potential embodiment of a steering axle according to the invention for a steerable vehicle.

Identical items, functional units and equivalent components are provided with the same reference signs in all the figures. These items, functional units and equivalent components in terms of the technical features are of identical embodiment, unless otherwise derived explicitly or implicitly from the description.

DETAILED DESCRIPTION

FIG. 1 shows in an exemplary and schematic manner a potential embodiment of a steering axle 1 according to the invention (illustrated only in fragments) for a steerable vehicle, for example for an industrial truck. The steering axle 1 comprises an axle housing 18 and a steering drive 24. The steering drive 24 in turn comprises an electric motor 2 having a motor shaft 3. According to the example, the steering drive 24 furthermore comprises a first planetary stage 20 having a first sun gear 4, first planet gears 5 and a first planet carrier 6. The first planet carrier 6 is connected in a rotationally fixed manner to the intermediary sun gear 7, which meshes with the intermediary planet gears 8, the latter in turn driving the intermediary planet carrier 17. The intermediary planet carrier 17 is connected in a rotationally fixed manner to the last sun gear 9, the latter in turn meshing with the last planet gears 10 and driving the latter. The last planet gears 10 are held by the last planet carrier 16. However, the last planet carrier 16 is connected in a rotationally fixed manner to the axle housing 18 and is thus prevented from performing a rotating movement. However, the last planet gears 10 also mesh with the ring gear 11 which is composed of three concentrically disposed individual ring gears 11', 11", 11", for example. The ring gear 11 is mounted so as to be rotatable about an axis 19. The steering drive 24 of FIG. 1 is thus configured such that a force flux from the motor shaft 3 runs by way of the first sun gear 4 and the first planet gears 5 to the first planet carrier 6, and that the force flux furthermore runs by way of the intermediary sun gear 7 to the intermediary planet gears 8 and from the latter to the intermediary planet carrier 17. The force flux from the intermediary planet carrier 17 furthermore runs to the last sun gear 9, onward to the last planet gears 10, and finally to the ring gear 11. As can be seen, the motor shaft 3 is mounted by way of the mounting 23, and the ring gear is mounted by way of the mounting 13, in an upper housing part 14 of the housing 25 of the steering drive 24. Moreover, the ring gear 11 by way of the mounting 15 is mounted on the last planet carrier 16. A steering arm 12 enables a steering link, not illustrated in FIG. 1, to be actuated by way of a rotating movement of the ring gear 11. Likewise, the steering arm 12 can be configured as a hub carrier having at least one cylindrical region for receiving a hub mounting. In this way, a steerable wheel of the steering axle 1 can be articulated directly by way of the ring gear 11. The pivot axis 19 of the ring gear 11 in this case is at the same time the steering axis of the axle-pivot steering system. In this instance, wheel forces can be transmitted to the axle housing 18 by way of the mountings 13 and 14.

LIST OF REFERENCE SIGNS

- 1 Steering axle
- 2 Electric motor
- 3 Motor shaft
- 4 First sun gear
- 5 First planet gears
- 6 First planet carrier
- 7 Intermediary sun gear
- 8 Intermediary planet gears
- 9 Last sun gear
- 10 Last planet gears
- 11 Ring gear
- 11', 11", 11'" Individual ring gear
- 12 Steering arm
- 13 Mounting
- 14 Upper housing part
- 15 Mounting
- 16 Last planet carrier
- 17 Intermediary planet carrier
- 18 Axle housing
- 19 Pivot axis of the ring gear
- 20 First planetary stage
- 21 Intermediary planetary stage
- 22 Last planetary stage
- 23 Mounting
- 24 Steering drive
- 25 Housing of the steering drive

The invention claimed is:

1. A steering axle for a steerable vehicle, comprising:
an axle housing;
a steering drive having an electric motor and a motor shaft;
a first planetary stage comprising a first sun gear, first planet gears, and a first planet carrier; and
a last planetary stage comprising a last sun gear, last planet gears, a last planet carrier, and a ring gear, wherein the ring gear in relation to the axle housing is mounted so as to be rotatable about a pivot axis, wherein the first planet gears are at least partially positioned within the ring gear, and wherein the last planet carrier is connected in a rotationally fixed manner to the axle housing;
wherein the steering drive is configured such that a force flux from the motor shaft runs by way of the first sun gear and the first planet gears to the first planet carrier, and such that the force flux furthermore runs by way of the last sun gear to the last planet gears, and wherein the force flux furthermore runs from the last planet gears to the ring gear;
wherein the ring gear comprises multiple individual ring gears that are concentrically disposed, the multiple individual ring gears including a ring gear on an external side having a pair of axially spaced steering arms extending radially outward from the ring gear and configured to rotate about the pivot axis.

2. The steering axle as claimed in claim 1, wherein the steering drive furthermore comprises at least one intermediary planetary stage which in turn comprises an intermediary sun gear, intermediary planet gears, and an intermediary planet carrier, the force flux from the first planet carrier running by way of the intermediary sun gear and the intermediary planet gears to the intermediary planet carrier, and the force flux furthermore running from the intermediary planet carrier to the last sun gear.

3. The steering axle as claimed in claim 1, wherein the steering drive comprises a housing and wherein the ring gear is rotatably mounted on the housing.

4. The steering axle as claimed in claim 1, wherein each of the steering arms is configured as a hub carrier for a steerable wheel of the steering axle.

5. The steering axle as claimed in claim 1, wherein the electric motor is disposed so as to be coaxial with the pivot axis.

6. The steering axle as claimed in claim 5, wherein the motor shaft is connected to the first sun gear in a rotationally fixed manner.

7. The steering axle as claimed in claim 1, wherein the electric motor is disposed so as to be parallel to the pivot axis.

8. A steerable vehicle comprising the steering axle as claimed in claim 1, wherein the steerable vehicle is an industrial truck.

* * * * *